Jan. 27, 1953  C. L. CALOSI  2,627,055
ELECTRONIC POSITION AND MOTION CONTROL SYSTEM
Filed Oct. 25, 1949  3 Sheets-Sheet 1

INVENTOR
CARLO L. CALOSI
BY Elmer J. Gorn
ATTORNEY

Jan. 27, 1953 C. L. CALOSI 2,627,055
ELECTRONIC POSITION AND MOTION CONTROL SYSTEM
Filed Oct. 25, 1949 3 Sheets-Sheet 2
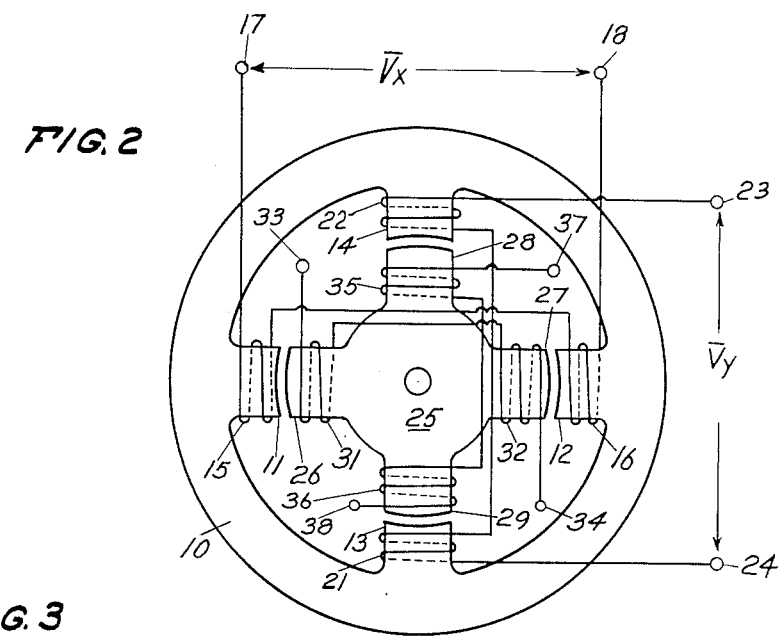
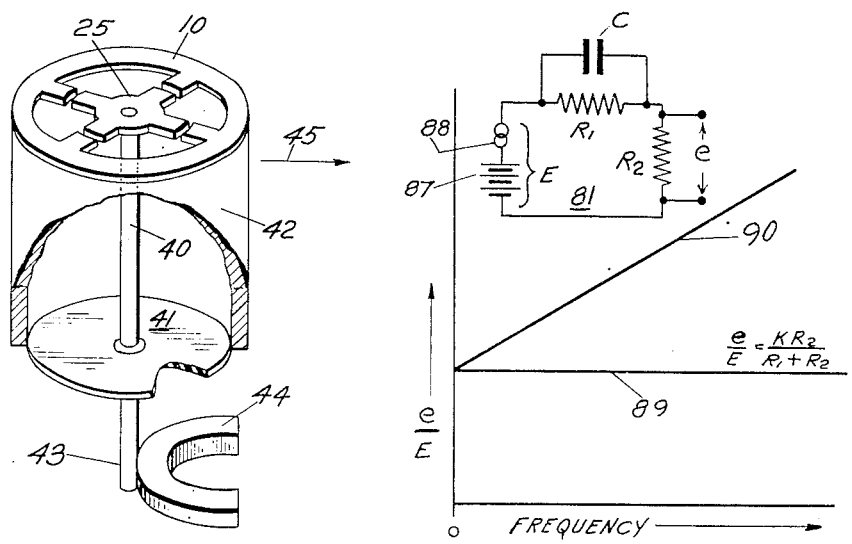
INVENTOR
CARLO L. CALOSI
BY Elmer J. Gorn
ATTORNEY Jan. 27, 1953      C. L. CALOSI      2,627,055
ELECTRONIC POSITION AND MOTION CONTROL SYSTEM
Filed Oct. 25, 1949      3 Sheets-Sheet 3
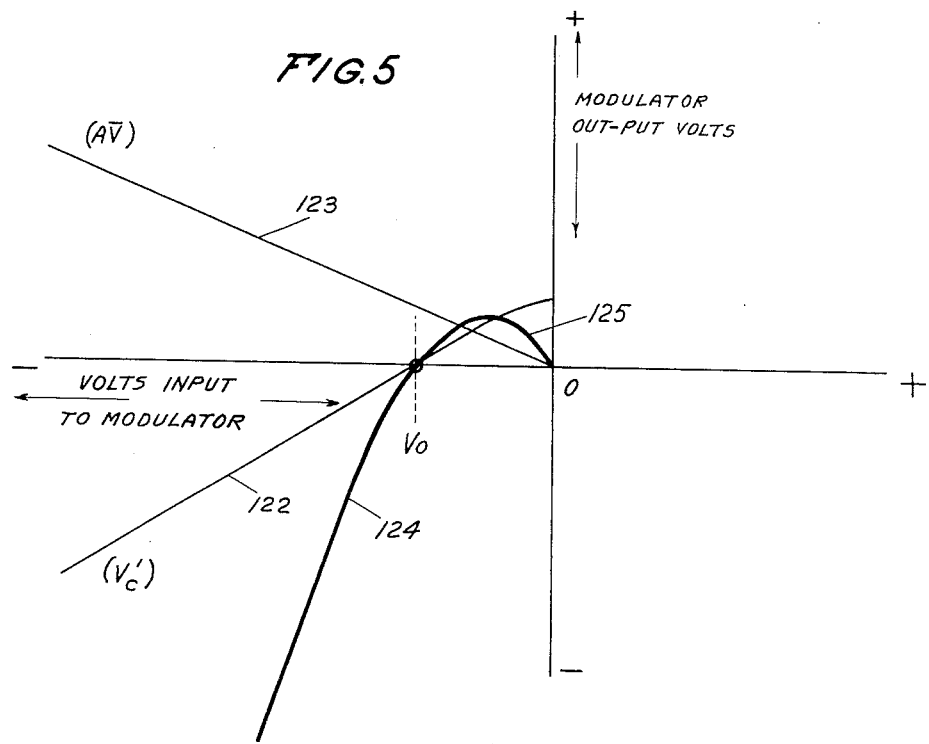
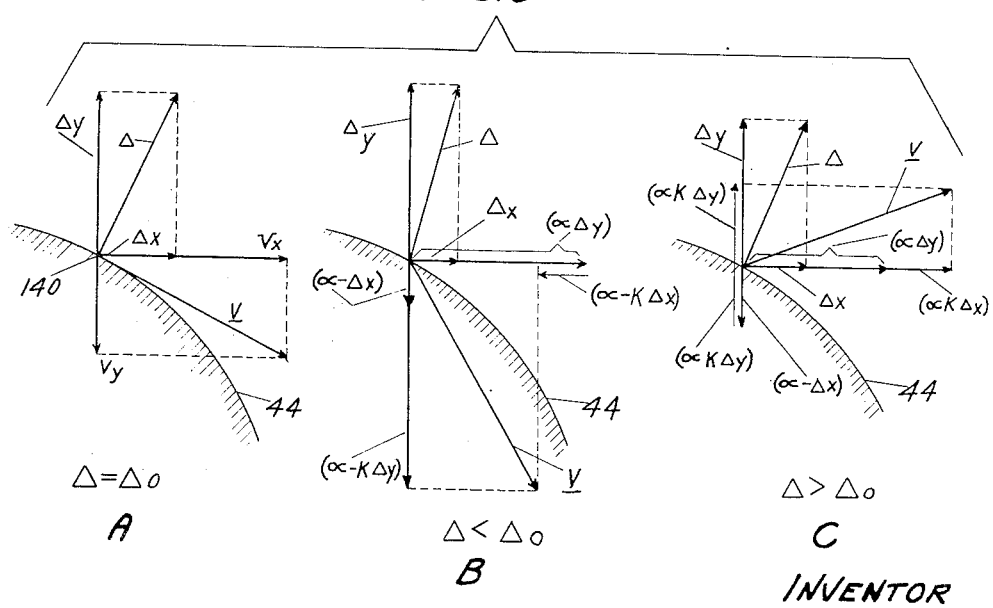
INVENTOR
CARLO L. CALOSI
BY Elmer J. Gorn
ATTORNEY Patented Jan. 27, 1953

2,627,055

UNITED STATES PATENT OFFICE 2,627,055

ELECTRONIC POSITION AND MOTION CONTROL SYSTEM

Carlo L. Calosi, Cambridge, Mass., assignor to Raytheon Manufacturing Company, Newton, Mass., a corporation of Delaware Application October 25, 1949, Serial No. 123,521

17 Claims. (Cl. 318—19)

This invention relates to electronic systems for supervising the position and motion of a controllable element, and more particularly to such systems which accurately and precisely govern the controlled element in response to a pair of voltages which represent vectorially disposed forces on the element.

In accordance with the present invention, the element which is to be controlled is coupled to a voltage generator, having means for generating two separate voltages, and is stressed to a prescribed degree by a force applied in a particular direction. The voltage generator means are so arranged with respect to each other that each generates a voltage, only when deflected in a particular direction, and the directions bearing a known angle with respect to each other. The voltages generated are thus representative of components of the stressing force, bearing the same angular relation. These voltages are originally of like frequency and phase, and are operated upon to provide between them an angular phase difference equal to the angle between the component forces. The resultant of the angularly disposed voltages is then employed to supervise the original stressing force, being proportional thereto. The invention advantageously employs antihunt features at this juncture, for example, by deriving from the resultant voltage a voltage proportional to the rate of change of the prestressing force. The antihunt voltage is employed, toegther with the resultant voltage, to maintain the prestressing force accurately within desired limits. In one embodiment of the invention, a fixed reference voltage is provided, representative of the desired prestressing force, and the control voltage is compared therewith to govern the prestressing force. In accordance with additional features of the invention, the supervised element may be caused to move in a path bearing an angular relation to the direction of the prestressing force by means of circuits and drive elements which combine the control potentials with the original voltages representing the components of the prestressing force in a manner tending accurately to control the motion. To this end, each original voltage is multiplied with the fixed reference voltage and the control voltage prior to comparison, and the resulting difference is algebraically added to, or subtracted from, the other control voltage, depending upon the direction of the desired motion.

*Description of an embodiment*

While it will be understood that the invention has many applications too numerous to be specifically mentioned herein, it will be described in connection with the problem of duplicating with a machine tool a contour which must be traced from a templet in two dimensions. In this problem a stylus, which is the controlled element, is fixed in space with relation to a cutting tool, while the templet is fixed in space with relation to a piece of material to be operated upon. The stylus and cutting tool together are moved into position against the templet and material, respectively. It is desired that the stylus shall, at all times, bear against the templet with a constant force directed normal to a line tangent with the templet at the point of contact, and shall move in the direction of the tangent with a constant velocity. For this purpose means are provided on the machine for driving the stylus and cutting tool in two orthogonally related directions, and, therefore, the components of the normal force are, in the system to be described, considered to be orthogonally related. A suitable circuit constructed in accordance with the invention for providing the foregoing features, together with other features and advantages, is described in detail below, reference being made to the accompanying drawings wherein:

Fig. 2 is a schematic diagram of a suitable voltage generator for use therewith;

Fig. 3 illustrates a manner of employing the generator to trace a contour;

Fig. 4 is a graph illustrating the operation of a portion of Fig. 1;

Fig. 5 is a graph illustrating the operation of another portion of Fig. 1; and

Fig. 6 is a group of graphic diagrams illustrating the operation of the system.

Figure 1:
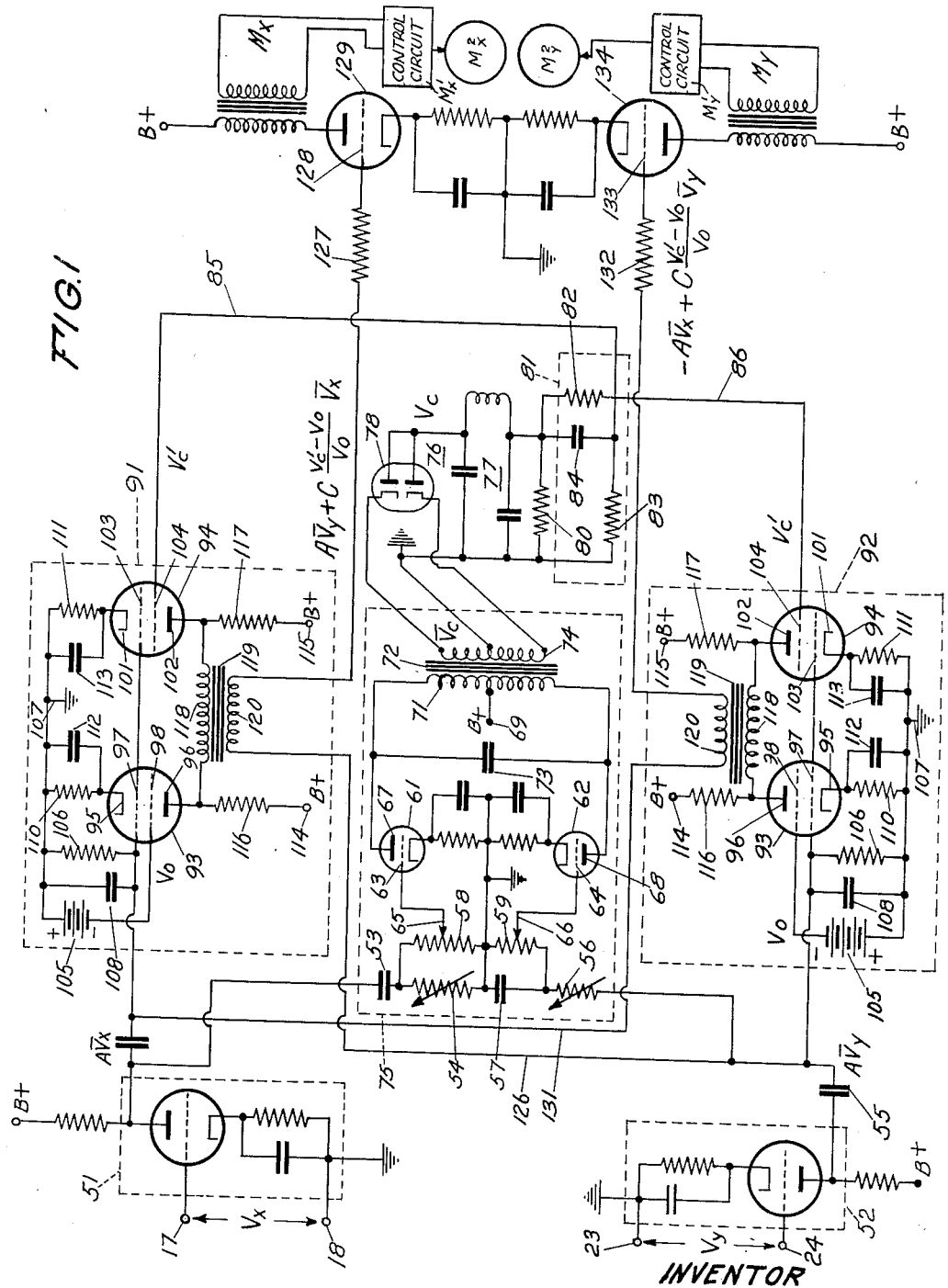
Fig. 1 is a schematic diagram of the circuit.

Referring now to Figs. 2 and 3, the voltage generator comprises a magnetic yoke 10 of annular form, having four equally distributed poles 11, 12, 13, and 14 directed radially inwardly from its inner periphery. On one pair of opposed poles 11 and 12 are wound similar coils 15 and 16, respectively, these coils being connected in series aiding between two terminals 17 and 18. On the second pair of opposed poles 13 and 14 are wound two similar coils 21 and 22, respectively, these two coils being likewise connected in series aiding between two terminals 23 and 24. Thus, one pair of coils 15 and 16 is wound on an axis which is orthogonally related to the axis of the other pair of coils 21 and 22.

A magnetizable armature 25, having four equally distributed poles 26, 27, 28, and 29 directed radially outwardly from its outer periphery, is disposed at the center of the yoke 10 with one pair of oppositely disposed poles 26 and 27 lying on the axis of one set of yoke coils 11 and 12, and the other pair of oppositely disposed poles 28 and 29 lying on the axis of the remaining pair of yoke coils 21 and 22. A pair of similar armature coils 31 and 32 is wound on the first pair of opposed poles 26 and 27, respectively, and connected in series aiding between two terminals 33 and 34. A second pair of similar coils 35 and 36 is wound on the second pair of opposed poles 28 and 29, respectively, and connected in series aiding between two terminals 37 and 38.

A source of alternating voltage (not shown) is connected across terminals 33 and 34, and 37 and 38, in parallel, when the voltage generator is in operation. The armature coils 31 and 32 then function as the primary winding of a first transformer, having yoke windings 11 and 12 as its secondary, while armature coils 35 and 36 function as the primary winding of a second transformer, having yoke windings 21 and 22 as its secondary. When the armature 25 is centrally disposed in the yoke 10, which disposition is regarded as neutral, the same voltage is induced into either half of the secondary winding of each transformer. However, when the armature 25 is displaced from the neutral position, it moves closer to some, and farther away from other secondary windings, with the result that the magnitudes of the voltages induced therein vary, becoming greater in the approached secondary windings and less in those which are farther away. It will be observed, however, that the voltages in both sets of secondary winding terminals 17—18 and 23—24 are always of the same phase.

As is illustrated in Fig. 3, the armature 25 is borne at the end of an elongated rod 40, or the like, which is supported at an intermediate region in a flexible diaphragm 41. The diaphragm 41 is supported at its periphery in a cylindrical container 42 which bears the yoke 10 at one end thereof. The armature 25 is suitably disposed within the yoke 10 at an end of the rod 40. The opposite end 43 of the rod 40 protrudes from the cylinder 42 through the diaphragm 41 and functions as a stylus, when brought into contact with a templet 44, the shape of which is to be duplicated. The stylus 43 is brought in contact with the templet 44 by moving the entire voltage generator assembly in the direction of the arrow 45, whereupon the flexible diaphragm 41 permits the armature 25 to be deflected from the neutral position. The deflecting force is normal to a line tangent to the templet 44 at the point or line of contact with the stylus 43. The two orthogonally related transformers provide voltages due to the deflection at terminals 17—18 and 23—24. These voltages are proportional to orthogonally related components of the original duplicating force, and are, therefore, conveniently termed $\overline{V}_x$ and $\overline{V}_y$, respectively. In the machine tool, motion is applied to the cutter and stylus parallel to these orthogonally related components of the displacement force. It is thus seen that, while $\overline{x}_x$ and $\overline{V}_y$ are alternating voltages of the same phase, these represent deflections of the stylus, or forces, which are physically at right angles to each other.

Referring now to Fig. 1, the voltage $\overline{V}_x$ is applied to an amplifier 51 of known form, and the voltage $\overline{V}_y$ is applied to a similar amplifier 52. The amplified output voltages of these amplifiers may be termed $A\overline{V}_x$ and $A\overline{V}_y$, respectively. The output of amplifier 51 is applied directly across a phase shift network comprising a capacitor 53 and a variable resistor 54 in series. The output of amplifier 52 is applied through a coupling capacitor 55 across a second phase shift network comprising a variable resistor 56 and a capacitor 57 in series. A potentiometer 58 is connected across variable resistor 54, and a potentiometer 59 is connected across capacitor 57. A pair of electron tubes 61 and 62 have their control grids 63 and 64 connected to the movable taps 65 and 66, respectively, of the potentiometers 58, 59, respectively. By this connection a voltage proportional to $A\overline{V}_x$ and shifted in phase forty-five degrees in one direction is applied to grid 63, while a voltage proportional to $A\overline{V}_y$ and shifted in phase forty-five degrees in the opposite direction is applied to grid 64. Anode potential is applied to the anodes 67 and 68 of tubes 61 and 62, respectively, at a B+ terminal 69 connected to the center tap of the primary winding 71 of a transformer 72 to the respective ends of which the anodes are connected. A filter capacitor 73 is connected between the anodes. A voltage proportional in magnitude to the vector sum of $A\overline{V}_x$ and $jA\overline{V}_y$ appears in the secondary winding 74 of transformer 72. This voltage, it will be appreciated, is also proportional in magnitude to the deflecting force on the stylus 43, and is conveniently termed a resultant voltage. The portion of the system contained within the dotted line box 75, including the phase shift network and the electronic addition circuit, may be termed a vector summation circuit.

The resultant voltage in secondary winding 74 is furnished to a full wave rectifier 76, including a double diode electron tube 78, and filtered in a filter 77, which removes the ripple corresponding to double the alternating current frequency furnished to the primary windings of the voltage generator. There then appears a unidirectional voltage in resistor 80 which has a magnitude proportional to the vector sum $$A\overline{V}_x + jA\overline{V}_y$$

or the deflection of the stylus 43.

The unidirectional voltage is operated upon in an antihunt circuit 81 which is in the present embodiment a derivative network. The derivative network comprises first and second resistors 82 and 83 connected in series across the resistor 80 and a capacitor 84 in parallel with the first resistor 82. The junction of resistors 80 and 83 is grounded in common with the center tap of secondary winding 74. The junction of the first and second resistors 82 and 83 is connected via lines 85 and 86 to first and second modulators 91 and 92, respectively, the operation of which will be presently described.

Referring now to Fig. 4, the operation of the derivative network 81 is as follows. The network is represented by two resistors $R_1$ and $R_2$ in series, with a capacitor C connected in parallel across resistor $R_1$. The input voltage E of the network is provided by a battery 87 providing unidirectional voltage and a generator 88 providing alternating voltage connected in series across the network. The voltage in resistor 80, consisting of an unvarying unidirectional voltage when the stylus deflection is constant, and a varying unidirectional voltage when the stylus deflection is varying, is thus accurately represented. The output voltage $e$ is taken across resistor $R_2$, corresponding to resistor 83 in Fig. 1. The graph of Fig. 4 illustrates the ratio $e/E$ with respect to the frequency with which the deflection of the stylus is changing. When the stylus pressure is constant, $e/E$ is constant and proportional to the ratio $R_2/(R_1+R_2)$. This is represented by a straight line 89. When the stylus pressure varies, the input voltage E has an alternating component 88 which is in part passed around resistor $R_1$ by capacitor C, the by-pass effect increasing with frequency. Accordingly, the voltage drop in resistor $R_2$ becomes greater as the frequency of variation of stylus deflection increases, so that the ratio $e/E$ becomes greater with frequency. This is represented by curve 90. Thus the output $e$ of the derivative network is greater with increased frequency of the variation of pressure on the stylus.

Referring again to Fig. 1, and particularly to the modulators 91 and 92, it will be seen that these are identical. Therefore, like parts of the modulators bear the same reference characters. The modulators comprise first and second electron tubes 93 and 94, respectively. The first electron tube 93 has a cathode 95, an anode 96, a first grid 97, and a second grid 98. The second electron tube 94 has a cathode 101, an anode 102, a first grid 103, and a second grid 104. The first grids 97 and 103 are connected together to the output of amplifier 51 or 52, and, therefore, are furnished with a voltage proportional to $A\overline{V}_x$ or $A\overline{V}_y$. This voltage appears in resistor 106 connected between the first grids and ground 107. A by-pass capacitor 108 is connected in parallel with resistor 106. The second grid 98 of the first tube 93 is provided with a fixed voltage $V_0$, by a battery 105 connected between ground 107 and the second grid, and poled to render the second grid negative with respect to the cathode 95. The cathodes 95 and 101 are each connected to ground 107 via a bias generating resistor 110 and 111, respectively. By-pass capacitors 112 and 113 are connected in parallel with resistors 110 and 111, respectively. The anodes 96 and 102 are arranged to be connected to a source of anode potential at B+ terminals 114 and 115 via resistors 116 and 117, respectively. The primary winding 118 of a transformer 119 is connected between the two anodes. The secondary winding 120 of transformer 119 furnishes the output of the modulator. Line 85 from the derivative network 81 is connected to the second grid 104 of the second tube 94 of the first modulator 91, and line 86 is connected to the same grid of the second modulator 92.

Referring now to Fig. 5, this figure illustrates the operation of the modulators 91 and 92. The output voltage of the modulator may have one polarity or another with respect to any particular reference point. The fixed voltage $V_0$ is, as will become more apparent below, the reference voltage which determines the static deflection of the stylus when the system is in operation. This is, in the present system, a negative voltage, for example, $-2$ volts, and is so shown in Fig. 5. The output voltage of the derivative network 81, which is termed $V'_c$ in Fig. 1 (and corresponds to $e$ in Fig. 4), causes an output from the modulator which is represented by curve 122. When $V_0$ and $V'_c$ are equal, the voltage levels at both ends of the primary winding 118 are the same, and the output of the modulator is zero. Therefore, curve 122 crosses the horizontal axis at the value $V_0$. At this point the polarity of the output changes. The output of the modulator is also influenced by the presence of the voltage $A\overline{V}_x$ or $A\overline{V}_y$ at the first grids of the tubes. The output of the modulator, due to this voltage, is represented by curve 123. When $A\overline{V}$ is at or below a cut-off level, the modulator output must in any case drop to zero. At other levels the modulator output is increased. Since in each tube $A\overline{V}$ is furnished at one grid and $V'_c$ or $V_0$ is furnished at the other grid, the effect at the anode is the product of $A\overline{V}$ and $V'_c$ or $V_0$. Therefore, the output of the modulator may be represented as the product of curves 122 and 123, which yields curve 124. In normal operation of the system, the output of the modulator is close to the point where curve 124 crosses the horizontal axis. At this point, the slope of curve 124 is very sharp, and the output of the modulator undergoes a phase change so that tight control of the system is afforded. The portion of curve 124 to the right of the hump, designated 125, represents a condition in which the stylus 43 is out of contact with the templet 44, and the system is not in normal operation.

The secondary winding 120 of modulator 91 is connected at one end via line 126 to the output of amplifier 52 and at the other end via a resistor 127 to the control grid 128 of a buffer amplifier tube 129. The secondary winding 120 of modulator 92 is connected at one end via line 131 to the output of amplifier 51 and at the other end via resistor 132 to the control grid 133 of a second buffer amplifier tube 134. By these connections $A\overline{V}_y$ is added to the output of modulator 91 as represented by curve 124 and $A\overline{V}_x$ is added to the output of modulator 92 as represented by curve 124. Since the grids 128 and 133 draw no current, the addition is accurately performed. However, $A\overline{V}_x$ is added in a negative fashion to modulator 92, for a purpose to be described below. The output $M_x$ of buffer amplifier tube 129 is provided to a suitable control circuit $M_x1$ having a motor $M_x2$ which moves the stylus and cutter tool in one orthogonal direction, while the output $M_y$ of the second buffer amplifier tube 134 is provided to another suitable control circuit $M_y1$ having a motor $M_y2$ which moves the stylus and cutter tool in the second orthogonal direction. Suitable motor control circuits for this purpose are well known to the prior art and are, therefore, not described or illustrated herein. Reference is made, however, to Patents Nos. 2,466,022 and 2,473,423, to Gorton, for motor control circuits which may be employed. In each of the circuits illustrated in these patents, the voltage $M_x$ or $M_y$ herein may be employed in place of the voltage furnished by rotor 9 of synchro or Selsyn 8 of the patent.

*Operation of the system*

The voltages $\overline{V}_x$ and $\overline{V}_y$ which are furnished by the generator in response to deflection of the stylus 43 are, as has already been mentioned, in the same electrical phase, although they represent in the present embodiment forces which are orthogonally related. These voltages are amplified in amplifiers 51 and 52 to provide amplified voltages $A\overline{V}_x$ and $A\overline{V}_y$, respectively. The vector summation circuit 75 provides voltages proportional to these amplified voltages with the same angular relation as the forces they represent, which in the present instance is ninety electrical degrees. Accordingly, the vector summation circuit provides in the secondary winding 74 a voltage $V_c$ which is proportional to $A(\overline{V}_x+j\overline{V}_y)$. This voltage may be expressed as follows after rectification:

$$V_c = B\sqrt{\overline{V^2}_x+\overline{V^2}_y}$$

where B is a constant of proportionality. The voltage $V_c$ then passes through the derivative network 81 where a factor proportional to the time rate of change thereof is added thereto. The output of the derivative network may accordingly be expressed $$V'_c = V_c(1 + Kp)$$

where K is a constant of proportionality and $p$ is the time derivative expressed in operational notation.

The voltage $V'_c$ is compared in the modulators 91 and 92 with the reference voltage $V_o$. The output of the modulator is zero when these two voltages are equal. Therefore, in this condition the stylus and cutter tool are moved neither to nor from the work, and the deflection of the stylus is as desired. Thus, $V_o$ is the reference voltage which determines the pressure on or the deflection of the stylus when it is in contact with the templet. As will be presently explained, $V_o$ determines also the speed of the stylus in the direction of the tangent.

The output of the modulator, due to the comparison of $V'_c$ and $V_o$, may be expressed $$k(V'_c - V_o)$$

where $k$ is a constant of proportionality. This may be expressed as follows:

$$\frac{V'_c - V_o}{V_o}$$

The quantity represented by this expression is multiplied in modulator 91 by a voltage proportional to $\overline{V}_x$ and in modulator 92 by a voltage proportional to $\overline{V}_y$. Thus, the output of modulator 91 as represented by curve 124 (Fig. 5) may be expressed as follows:

$$C \frac{V'_c - V_o}{V_o} \overline{V}_x$$

where C is a constant of proportionality, and the output of modulator 92 is similarly $$C \frac{V'_c - V_o}{V_o} \overline{V}_y$$

The voltage applied to the grid 128 of buffer amplifier tube 129 consists of the output of modulator 91 represented by curve 124 (Fig. 5) and $A\overline{V}_y$, and has the following form:

$$\overline{V}M_x = A\overline{V}_y + C \frac{V'_c - V_o}{V_o} \overline{V}_x$$

The voltage which is applied to the grid 133 of the second buffer amplifier tube 134 consists of the output of modulator 92 as representd by curve 124 (Fig. 5) and $A\overline{V}_x$ negatively added thereto, and has the following form:

$$\overline{V}M_y = -A\overline{V}_x + C \frac{V'_c - V_o}{V_o} \overline{V}_y$$

$\overline{V}M_x$ is thus a vector voltage determining the speed and direction of motion of the motor for one orthogonal coordinate and $\overline{V}M_y$ is a vector voltage accomplishing the same purpose for the other orthogonal coordinate.

Referring now to Fig. 6, and particularly to Fig. 6A thereof, a portion of the templet 44 is shown, it being assumed that the stylus is in contact therewith at contact point 140 and that the deflection thereof and pressure thereon are constant. The deflection is represented by a vector labeled $\Delta$, and the orthogonal coordinates of this vector are represented by vectors $\Delta_x$ and $\Delta_y$. The stylus moves along the templet in a direction tangent thereto at the contact point 140 with a velocity $v$. This velocity is, in the present instance, in a clockwise direction, and the manner of determining it will be explained below. The velocity $v$ is derived from two orthogonal components $v_x$ and $v_y$, which are proportional, respectively, to $\overline{V}M_x$ and $\overline{V}M_y$. Also $\overline{V}_x$ and $\overline{V}_y$ are proportional, respectively, to $\Delta_x$ and $\Delta_y$. Therefore, $$v_x \propto \Delta_y + K\Delta_x\left(\frac{\Delta - \Delta_o}{\Delta_o}\right) \quad \text{Relation 1}$$

$$v_y \propto -\Delta_x + K\Delta_y\left(\frac{\Delta - \Delta_o}{\Delta_o}\right) \quad \text{Relation 2}$$

where $\Delta_o$ represents the deflection for which $V'_c$ equals $V_o$, and K is a coefficient or constant of proportionality, depending upon the amplification which is present in the modulator 91 or 92. Examining Relations 1 and 2, it is apparent that, if the deflection $\Delta$ is equal to $\Delta_o$ (which is pre-established by the fixed voltage $V_o$), $v_x \propto \Delta_y$ and $-v_y \propto -\Delta_x$. This means that the stylus moves along the templet in a tangential direction and, due to the minus sign preceding $\Delta_x$, $v_y$ is vectorially in a direction opposite to $\Delta_y$ so that the velocity $v$ is in a clockwise direction. The minus sign is provided by making the proper connection between line 131 and the secondary winding 120 of modulator 92 in Fig. 1 so that the voltage $A\overline{V}_x$ opposes rather than aids the voltage already present in the secondary winding. The velocity $v$ is easily seen to be constant since, from the geometry, $$v = \sqrt{v_x^2 + v_y^2}$$

which is proportional to $$\sqrt{(\Delta_y)^2 + (\Delta_x)^2}$$

which is in turn equal to $\Delta$. Therefore, $v$ is proportional to $\Delta$, which, we have seen, is maintained constant and equal to $\Delta_o$.

Fig. 6B represents the conditions that exist when $\Delta$ is less than $\Delta_o$, that is, when the stylus 43 is not in contact with the templet 44 with the desired force. In this case it appears from Relation 1 that $v_x$ is proportional to $\Delta_y$ diminished by a factor proportional to $K\Delta_x$. Similarly it appears from Relation 2 that $v_y$ is proportional to $-\Delta_x$ increased in the negative direction by a factor proportional to $K\Delta_y$. As is shown in Fig. 6B, the resulting velocity $v$ is in a direction into the templet, which means that the stylus and cutter tool are driven into the templet and work so that $\Delta$ increases in value toward $\Delta_o$.

Referring now to Fig. 6C, this illustrates the conditions when $\Delta$ is greater than $\Delta_o$, which occurs when the deflection of the stylus is greater than desired. From Relation 1, it is apparent that $v_x$ is then the sum of two factors, one proportional to $\Delta_y$ and the other proportional to $K\Delta_x$. Similarly $v_y$ is the sum of two factors of which one is proportional to $-\Delta_x$ and the other is proportional to $K\Delta_y$ in the opposite direction. This results in a velocity $v$ which is directed out of the templet, and, therefore, tends to reduce $\Delta$ toward $\Delta_o$ in value.

From what has been explained, it follows that, after bringing the stylus 43 into contact with the templet 44, contact is automatically maintained with constant deflection, and the stylus controls the duplicating machine, maintaining constant speed between the cutting tool and the work piece. The value of this speed $v$ can be varied by changing the value of the fixed reference voltage $V_o$.

Although the invention has been illustrated in connection with an embodiment thereof for controlling motion in two orthogonal coordinates, it will be apparent to those skilled in the art that it is not limited thereby. The motion controlled may be in coordinates having any desired angular relation thereto, for example, the coordinate system may be skewed. The vector summation circuit 75 will in such cases merely be made to apply the same angular conditions to the input voltages as obtain in the coordinate system being employed. Also the antihunt portion of the system 81 need not be a derivative network but may appear in many of the well-known forms of antihunt circuits. It has been found, however, that the placing of the antihunt circuit in its present disposition immediately following the vector summation circuit has particular value in successfully eliminating hunting in the system. This follows partly from the fact that the careful filtering in the filtering network 77 of the rectified voltage $V_c$ introduces certain electrical delays in the system, and this delay influences the response and the stability of the system. In like manner, it is not necessary that the modulators 91 and 92 have only the form illustrated herein. Other comparison circuits are known which are suitable for relating one voltage $V'_c$ to another voltage $V_o$ and may be employed if desired. It is, therefore, intended that the claims which follow shall not be limited by particular details of the embodiment of the invention shown and described herein, but only by the prior art.

What is claimed is:

1. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, circuit means having an input to which the phase-shifted input voltages are applied for deriving from said phase shifted voltages a resultant voltage proportional in magnitude to the resultant of said forces, an antihunt circuit connected to the output of said circuit means for deriving an antihunt voltage from variations in the magnitude of said resultant voltage, and means employing said antihunt voltage to supervise the magnitude of said resultant force.

2. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means deriving an antihunt voltage from variations in the magnitude of said resultant voltage, and means employing said resultant voltage and said antihunt voltage together to supervise said resultant force.

3. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means providing a fixed voltage the magnitude of which is representative of a desired magnitude of said resultant force, and means arranged to compare the magnitude of said resultant voltage with the magnitude of said fixed voltage and thereby supervise said resultant force.

4. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means providing a third voltage proportional to the algebraic product of said first voltage and said resultant voltage, means providing a fourth voltage proportional to the algebraic product of said second voltage and said resultant voltage, and means employing said third and fourth voltages to supervise the magnitudes of said first and second forces, respectively.

5. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means providing a fixed voltage representative of a desired magnitude of said resultant force, means arranged to compare a voltage proportional to the product of said first input voltage and said fixed voltage with a voltage proportional to the product of said resultant voltage and said first input voltage and provide a third voltage proportional to the difference between the voltages compared, means arranged to compare a voltage proportional to the product of said second input voltage and said fixed voltage with a voltage proportional to the product of said resultant voltage and said second input voltage and provide a fourth voltage proportional to the difference between the voltage compared, and means employing said third and fourth voltages to supervise the magnitudes of said first and second forces, respectively.

6. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means providing a fixed voltage representative of a desired magnitude of said resultant force, means arranged to compare a voltage proportional to the product of said first input voltage and said fixed voltage with a voltage proportional to the product of said resultant voltage and said first input voltage and provide a third voltage proportional to the difference between the voltages compared, means arranged to compare a voltage proportional to the product of said second input voltage and said fixed voltage with a voltage proportional to the product of said resultant voltage and said second input voltage and provide a fourth voltage proportional to the difference between the voltages compared, means providing a fifth voltage proportional to the algebraic sum of said second input voltage and said third voltage, means providing a sixth voltage proportional to the algebraic difference of said first input voltage and said fourth voltage, and means employing said fifth and sixth voltages to supervise the magnitudes of said first and second forces, respectively.

7. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means deriving an antihunt voltage proportional to the time rate of change of said resultant voltage, and means employing said antihunt voltage to supervise the magnitude of said resultant force.

8. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means deriving an antihunt voltage proportional to the time rate of change of said resultant voltage, means deriving a control voltage proportional to the instantaneous sum of said resultant voltage and said antihunt voltage, and means employing said control voltage to supervise the magnitude of said resultant force.

9. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means deriving an antihunt voltage proportional to the time rate of change of said resultant voltage, means deriving a control voltage proportional to the instantaneous sum of said resultant voltage and said antihunt voltage, means providing a fixed voltage representative of a desired magnitude of said resultant force, means arranged to compare a voltage proportional to the product of said first input voltage and said fixed voltage with a voltage proportional to the product of said control voltage and said first input voltage and provide a third voltage proportional to the difference between the voltages compared, means arranged to compare a voltage proportional to the product of said second input voltage and said fixed voltage with a voltage proportional to the product of said control voltage and said second input voltage and provide a fourth voltage proportional to the difference between the voltages compared, and means employing said third and fourth voltages to supervise the magnitudes of said first and second forces, respectively.

10. In combination, first and second input circuits adapted to receive first and second vector input voltages, respectively, of like frequency and electrical phase, said voltages being representative, respectively, of first and second angularly disposed directional forces, means for electrically phase shifting said input voltages to provide the same angular phase difference between them as between said forces, means for deriving from said phase shifted voltages a resultant voltage proportional in magnitude to the resultant of said forces, means deriving an antihunt voltage proportional to the time rate of change of said resultant voltage, means deriving a control voltage proportional to the instantaneous sum of said resultant voltage and said antihunt voltage, means providing a fixed voltage representative of a desired magnitude of said resultant force, means arranged to compare a voltage proportional to the product of said first input voltage and said fixed voltage with a voltage proportional to the product of said control voltage and said first input voltage and provide a third voltage proportional to the difference between the voltages compared, means arranged to compare a voltage proportional to the product of said second input voltage and said fixed voltage with a voltage proportional to the product of said control voltage and said second input voltage and provide a fourth voltage proportional to the difference between the voltages compared, means providing a fifth voltage proportional to the algebraic sum of said second input voltage and said third voltage, means providing a sixth voltage proportional to the algebraic difference of said first input voltage and said fourth voltage, and means employing said fifth and sixth voltages to supervise the magnitudes of said first and second forces, respectively.

11. In duplicating equipment, apparatus for controlling a stylus in contact with a templet comprising, in combination, means to resolve contact force on the stylus normal to the tangent to said templet into first and second voltages of like electrical phase and frequency and proportional, respectively, to first and second rectangularly disposed component forces of said normal force, means providing two voltages each proportional to one of said voltages but ninety electrical degrees apart, circuit means having an input to which said two voltages are applied for deriving from said two voltages a resultant voltage proportional in magnitude to said normal force, an antihunt circuit connected to the output of said circuit means for deriving from said resultant voltage an antihunt voltage in accordance with changes in said normal force, and means employing said antihunt voltage to supervise said normal force.

12. In duplicating equipment, apparatus for controlling a stylus in contact with a templet comprising, in combination, means to resolve contact force on the stylus normal to the tangent to said templet into first and second voltages of like electrical phase and frequency and proportional, respectively, to first and second rectangularly disposed component forces of said normal force, means providing two voltages each proportional to one of said voltages but ninety electrical degrees apart, means deriving from said two voltages a resultant voltage proportional in magnitude to said normal force, means providing a fixed voltage the magnitude of which is representative of a desired magnitude of said normal force, and means arranged to compare the magnitude of said resultant voltage with the magnitude of said fixed voltage and thereby supervise said normal force.

13. In duplicating equipment, apparatus for controlling a stylus in contact with a templet comprising, in combination, means to resolve contact force on the stylus normal to the tangent to said templet into first and second voltages of like electrical phase and frequency and proportional, respectively, to first and second rectangularly disposed component forces of said normal force, means providing two voltages each proportional to one of said voltages but ninety electrical degrees apart, means deriving from said two voltages a resultant voltage proportional in magnitude to said normal force, means providing a third voltage proportional to the algebraic product of said first voltage and said resultant voltage, means providing a fourth voltage proportional to the algebraic product of said second voltage and said resultant voltage, and means employing said third and fourth voltages to supervise the magnitudes of said first and second forces, respectively.

14. In duplicating equipment, apparatus for controlling a stylus in contact with a templet comprising, in combination, means to resolve contact force on the stylus normal to the tangent to said templet into first and second voltages of like electrical phase and frequency and proportional, respectively, to first and second rectangularly disposed component forces of said normal force, means providing two voltages each proportional to one of said voltages but ninety electrical degrees apart, means deriving from said two voltages a resultant voltage proportional in magnitude to said normal force, means providing a fixed voltage representative of a desired magnitude of said normal force, means arranged to compare a voltage proportional to the product of said first voltage and said fixed voltage with a voltage proportional to the product of said first voltage and said resultant voltage and provide a third voltage proportional to the difference between the voltages compared, means arranged to compare a voltage proportional to the product of said second voltage and said fixed voltage with a voltage proportional to the product of said second voltage and said resultant voltage and provide a fourth voltage proportional to the difference between the voltages compared, and means employing said third and fourth voltages to supervise the magnitudes of said first and second component forces, respectively.

15. In duplicating equipment, apparatus for controlling a stylus in contact with a templet comprising, in combination, means to resolve contact force on the stylus normal to the tangent to said templet into first and second voltages of like electrical phase and frequency and proportional, respectively, to first and second rectangularly disposed component forces of said normal force, means providing two voltages each proportional to one of said voltages but ninety electrical degrees apart, means deriving from said two voltages a resultant voltage proportional in magnitude to said normal force, means providing a fixed voltage representative of a desired magnitude of said normal force, means arranged to compare a voltage proportional to the product of said first voltage and said fixed voltage with a voltage proportional to the product of said first voltage and said resultant voltage and provide a third voltage proportional to the difference between the voltages compared, means arranged to compare a voltage proportional to the product of said second voltage and said fixed voltage with a voltage proportional to the product of said second voltage and said resultant voltage and provide a fourth voltage proportional to the difference between the voltages compared, means providing a fifth voltage proportional to the algebraic sum of said second voltage and said third voltage, means providing a sixth voltage proportional to the algebraic difference between said first voltage and said fourth voltage, and means employing said fifth and sixth voltages to supervise the magnitudes of said first and second component forces, respectively.

16. In duplicating equipment, apparatus for controlling a stylus in contact with a templet comprising, in combination, means to resolve contact force on the stylus normal to the tangent to said templet into first and second voltages of like electrical phase and frequency and proportional, respectively, to first and second rectangularly disposed component forces of said normal force, means providing two voltages each proportional to one of said voltages but ninety electrical degrees apart, means deriving from said two voltages a resultant voltage proportional in magnitude to said normal force, means deriving from said resultant voltage an antihunt voltage proportional to the time rate of change of said normal force, and means employing said antihunt voltage to supervise said normal force.

17. In duplicating equipment, apparatus for controlling a stylus in contact with a templet comprising, in combination, means to resolve contact force on the stylus normal to the tangent to said templet into first and second voltages of like electrical phase and frequency and proportional, respectively, to first and second rectangularly disposed component forces of said normal force, means providing two voltages each proportional to one of said voltages but ninety electrical degrees apart, means deriving from said two voltages a resultant voltage proportional in magnitude to said normal force, means deriving from said resultant voltage an antihunt voltage proportional to the time rate of change of said normal force, means deriving a control voltage proportional to the instantaneous sum of said resultant voltage and said antihunt voltage, and means employing said control voltage to supervise the magnitude of said resultant force.

CARLO L. CALOSI.

REFERENCES CITED

The following references are of record in the file of this patent:

UNITED STATES PATENTS

| Number | Name | Date |
|---|---|---|
| 2,395,525 | Wilkie et al. | Feb. 26, 1946 |
| 2,410,295 | Kuehni et al. | Oct. 29, 1946 |
| 2,470,244 | Fryklund | May 17, 1949 |
| 2,475,245 | Leaver et al. | July 5, 1949 |
| 2,492,731 | Branson | Dec. 27, 1949 |